R. M. ROBERTS.
VEHICLE WHEEL TIRE.
APPLICATION FILED JAN. 16, 1915.
1,179,654.
Patented Apr. 18, 1916.
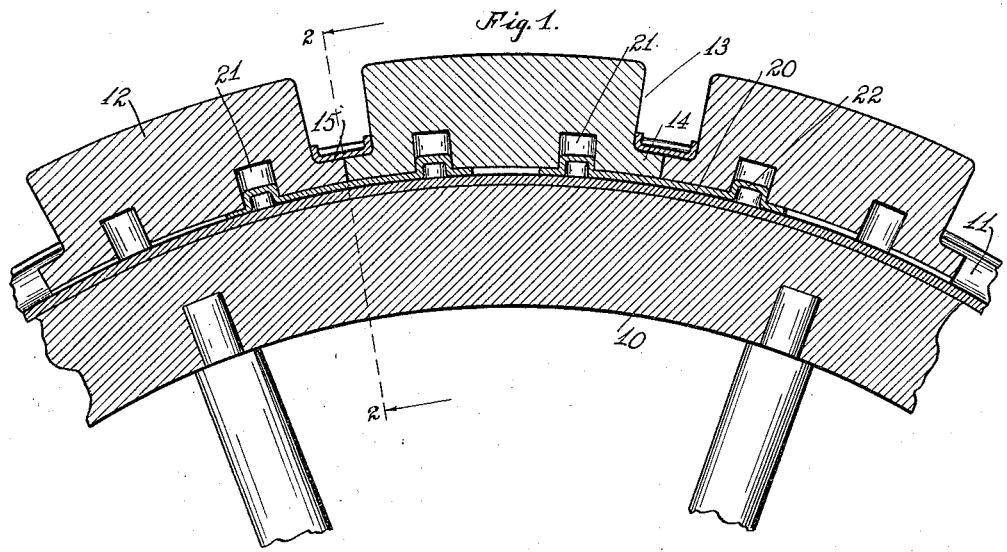
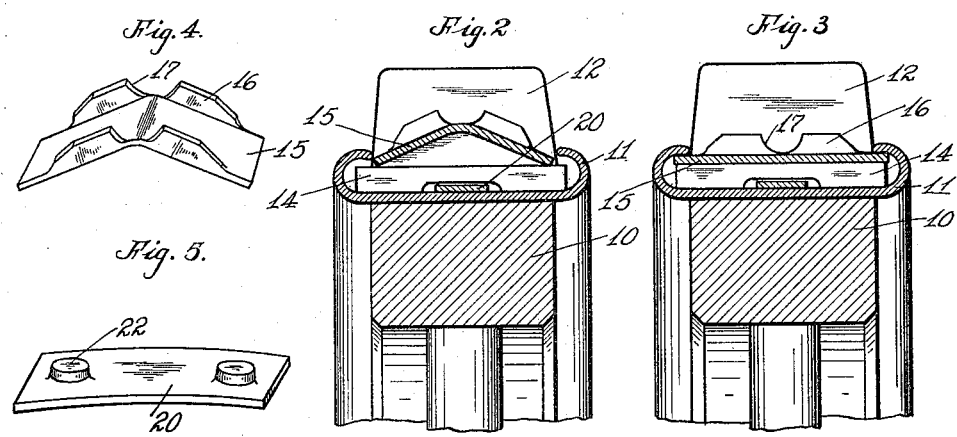
WITNESSES:
INVENTOR
Robert M. Roberts.
BY
ATTORNEY

UNITED STATES PATENT OFFICE.

ROBERT M. ROBERTS, OF ANDERSON, INDIANA, ASSIGNOR TO FREDERICK T. BARBER, OF ANDERSON, INDIANA.

VEHICLE-WHEEL TIRE.

1,179,654.  Specification of Letters Patent.  Patented Apr. 18, 1916.

Application filed January 16, 1915. Serial No. 2,655.

*To all whom it may concern:*

Be it known that I, ROBERT M. ROBERTS, a citizen of the United States, and a resident of Anderson, county of Madison, and State of Indiana, have invented a certain new and useful Vehicle-Wheel Tire; and I do hereby declare that the following is a full, clear, and exact description thereof, reference being had to the accompanying drawings, in which like letters refer to like parts.

The object of this invention is to simplify and cheapen the construction of vehicle wheel tires, particularly those adapted for motor trucks and like use; and to render such tires sectional and readily repairable by cutting any injured portion of the tire away and substituting a section limited to the injured portion.

The invention enables solid rubber tires to be very cheaply repaired. It is unnecessary to throw away the entire tire when it is injured only at one point for by this invention only the injured portion is replaced, the remainder of the tire being continued in use. The invention also is such as to render a solid rubber tire easily mounted or dismounted.

The full nature of the invention will be understood from the accompanying drawings and the following description and claim.

In the drawings, Figure 1 is a central vertical section through a portion of such vehicle wheel, the remaining portions being broken away. Fig. 2 is a section on the line 2—2 of Fig. 1 during the process of mounting the tire. Fig. 3 is the same showing the tire fully mounted. Fig. 4 is a perspective view of a tire holding plate before it is put in place. Fig. 5 is a perspective view of one of the link plates for holding adjacent sections together.

There is shown in the drawings herein the felly 10 of a vehicle wheel having a clencher rim 11 thereon, that is, a frame having inturned outwardly extending flanges in which a solid rubber tire 12 is seated. The tire may be in one or more sections, as desired, and the ends of the section or sections of the tire are held in place in the following manner: Each end of a section of the tire is cut out at 13 so as to leave the inner portion 14 of the tire section uncut and, therefore, projecting, say an inch or some such distance. The thickness of the base projection 14 of the tire section is somewhat less than the projection of the flanges of the clencher rim 11 so that there will be a slight space between the upper surface of said projection 14 and the inwardly turned edges of said flanges, as shown in Fig. 2. When the two adjacent ends of a section or sections are brought together, their adjacent base portions 14 abut against each other and there is left a considerable gap at 13 between the remaining portions of the adjacent ends, as shown in Fig. 1. In and across this gap an A-shaped tire holding plate 15 is placed, in the form shown in Figs. 2 and 4, and of a length rigidly fixed between the inturned flanges of the clencher rim 11. Thereafter force is applied to the central portion of said plate 15 to straighten it and at the same time press it down and upon the fixed projection 15 to the position shown in Fig. 3. That spreads the projection 15 laterally of the tire and projects its ends under the inturned edges of the flanges of the clencher rim. When such a plate 15 is thus straightened, as shown in Fig. 3, it will effectually hold the adjacent ends of the tire in the rim and from outward escape. The foregoing constitutes the main features of the invention. Said plate 15 has side flanges 16 which abut against the cut-out portions of the tire sections, but said flanges 16 are centrally cut away at 17 to permit the bending of the plate 15. After said plate 15 is in place in the tire frame, it cannot be removed excepting by a tool strong enough to rebend it and withdraw it from the clencher rim.

The number of sections constituting the total tire is immaterial. In the beginning there may be only one section, but when the tire is injured at any point, it can be cut away at that point and a repair portion of the tire inserted, as shown in the middle portion of Fig. 1. This can be repeated and repeated and thus the same tire be constantly used, but repaired at the point where worn.

Another feature of the invention is providing the tie bars 20 for holding the two tire sections from being moved circumferentially of the tire. Solid rubber tires usually have circular recesses 21 on their inner surfaces to render the tire more elastic. The bar 20 consists of a metal plate with lugs 22 stamped therein near each end so that the plate can be placed flat on the clencher rim and the lugs 22 at the ends thereof project into the recesses of the tire sections near their abutting ends, as shown in Fig. 1. With the bar 20 there is no chance for the tire sections to move away from each other and, therefore, said plates coöperate with the plate 15 which is over the central portion of the tie plate and holds it down in place.

The invention claimed is:

The combination of a channeled vehicle wheel rim with inturned flanges, a rubber tire with transversely reduced adjacent ends having abutting inner portions, and a plate extending across said ends and over the abutting portions and under the inturned flanges of the rim, said plate having lateral flanges abutting against the notched portions of the tire, and said flanges being centrally cut away to permit said plates to be bent for insertion in the tire and thereafter straightened.

In witness whereof, I have hereunto affixed my signature in the presence of the witnesses herein named.

ROBERT M. ROBERTS.

Witnesses:
 ROBT. W. WEBB,
 BLAINE H. BALL.